United States Patent
Tamaizumi et al.

(10) Patent No.: US 7,009,358 B2
(45) Date of Patent: Mar. 7, 2006

(54) ELECTRIC POWER STEERING DEVICE AND METHOD FOR CONTROLLING THE SAME

(75) Inventors: Terutaka Tamaizumi, Aichi (JP); Yoshinobu Shimizu, Osaka (JP); Shinya Aono, Aichi (JP); Akihiro Nishiyama, Aichi (JP); Takanobu Takamatsu, Osaka (JP); Masayuki Kita, Aichi (JP); Tomoyuki Yamauchi, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 65 days.

(21) Appl. No.: 10/695,995

(22) Filed: Oct. 30, 2003

(65) Prior Publication Data

US 2004/0140788 A1    Jul. 22, 2004

(30) Foreign Application Priority Data

Oct. 31, 2002 (JP) ............................ P.2002-317912
Mar. 25, 2003 (JP) ............................ P.2003-082978

(51) Int. Cl.
*B62D 6/00* (2006.01)
*G06F 17/00* (2006.01)
*G05D 23/275* (2006.01)
*H02P 7/00* (2006.01)

(52) U.S. Cl. ............... 318/632; 318/432; 318/433; 701/41; 701/42

(58) Field of Classification Search ........... 318/632, 318/432, 433; 180/443, 446; 701/41, 42
See application file for complete search history.

(56) References Cited

U.S. PATENT DOCUMENTS 4,666,013 A * 5/1987 Shibahata et al. ........... 180/421
4,972,320 A * 11/1990 Sugiura et al. ............... 701/43

(Continued)

FOREIGN PATENT DOCUMENTS

EP        0 718 174 A2    6/1996

(Continued)

OTHER PUBLICATIONS

European Search Report dated Feb. 24, 2004.

*Primary Examiner*—Marlon T. Fletcher
*Assistant Examiner*—Patrick Miller
(74) *Attorney, Agent, or Firm*—McGinn IP Law Group, PLLC

(57) ABSTRACT

The present invention provides an electric power steering device enabled to compensate for the influence of the inertia of a steering-assisting-force generating motor on steering with accurate timing even when a steering direction is reversed at high speed. Based on steering torque and a rotation angular speed of a steering-assisting-force generating motor, a steering angular acceleration correspondence value is obtained. The device has means for regulating a gain, which is multiplied to a change acceleration of the steering torque. The motor is controlled so that the steering assisting force is corrected according to a motor output correction value obtained on the basis of the relation between the motor output correction value and the steering angular acceleration correspondence value, which is preliminarily determined and stored in such a way as to compensate for the influence of the inertia on steering, and the obtained steering angular acceleration correspondence value.

9 Claims, 3 Drawing Sheets

U.S. PATENT DOCUMENTS

| | | | |
|---|---|---|---|
| 5,076,381 A * | 12/1991 | Daido et al. | 180/446 |
| 5,469,357 A * | 11/1995 | Nishimoto | 701/41 |
| 5,740,040 A * | 4/1998 | Kifuku et al. | 701/41 |
| 6,360,151 B1 * | 3/2002 | Suzuki et al. | 701/41 |
| 6,389,342 B1 * | 5/2002 | Kanda | 701/41 |
| 6,490,514 B1 * | 12/2002 | Kurishige et al. | 701/41 |
| 6,594,568 B1 * | 7/2003 | Matsuoka | 701/41 |
| 6,597,136 B1 * | 7/2003 | Burton et al. | 318/432 |
| 6,768,283 B1 * | 7/2004 | Tanaka et al. | 318/632 |
| 6,854,559 B1 * | 2/2005 | Kurishige et al. | 180/446 |
| 2002/0125845 A1 * | 9/2002 | Burton et al. | 318/432 |
| 2003/0052639 A1 * | 3/2003 | Tanaka et al. | 318/632 |

FOREIGN PATENT DOCUMENTS

JP  2694213  9/1997

* cited by examiner

ELECTRIC POWER STEERING DEVICE AND METHOD FOR CONTROLLING THE SAME

BACKGROUND OF THE INVENTION

1. Field of the Invention

The present invention relates to an electric power steering device that gives a steering assisting force by using a motor and a method for controlling the electric power steering device.

2. Description of the Related Art

In a related electric power steering device adapted to give a steering assisting force by using a motor, the steering assisting force is changed according to operating conditions, such as steering torque and a vehicle speed. However, in the case of employing such a related electric power steering device adapted to simply change the steering assisting force according to the operating conditions, when a steering speed is changed, a steering feeling is worsened under the influence of the inertia of a moving part of a steering system, which includes the motor. Thus, the following countermeasure is taken. That is, a rotation angular speed of the motor is obtained according to the inter-terminal voltage, electric current, resistance, counter-electromotive-force constant of the motor thereof. Then, an output of the motor is corrected according to a rotation angular acceleration computed from the obtained rotation angular speed in such a manner as to compensate for the influence of the inertia of the moving part on steering. However, the obtained rotation angular acceleration of the motor lags behind an actual angular acceleration of the steering wheel, which is caused by actual steering. Consequently, the influence of the inertia cannot be compensated for with timing with which such influence should be compensated for. Thus, the steering feels heavy.

Thus, there has been proposed a related power steering device adapted to compensate for the influence of the inertia according to an angular acceleration of a steering wheel, which corresponds to a sum of a change is acceleration of steering torque and a rotation angular acceleration of a motor, instead of a rotation angular acceleration of the motor (see Patent Document 1).

[Patent Document 1]

Japanese Patent No. 2,694,213.

However, the related device has encountered problems that when a steering direction is reversed at high speed, the related device cannot accurately compensate for the influence of the inertia with timing with which the device should compensate for the influence thereof, and that a steering feeling is worsened.

SUMMARY OF THE INVENTION

Accordingly, an object of the invention is to provide an electric power steering device enabled to solve the aforementioned problems.

To achieve the foregoing object, according to the invention, there is provided an electric power steering device, which comprises a motor for generating a steering assisting force, means for obtaining steering torque, means for obtaining a rotation angular speed of the motor, means for obtaining a steering angular correspondence value, which corresponds to a sum of a value obtained by multiplying a change acceleration of the steering torque by a gain and a rotation angular acceleration of the motor, according to the obtained steering torque and the obtained rotation angular speed of said motor, means for regulating the gain, means for storing relation between a motor output correction value, which is preliminarily determined in such a way as to compensate for the influence of the inertia on steering, and the steering angular acceleration correspondence value, and means for controlling the motor in such a way as to correct a steering assisting force according to the motor output correction value obtained according to the obtained steering angular acceleration correspondence value and the stored relation.

According to the invention, the influence of the inertia of the steering-assisting-force generating motor is compensated for according to a steering angular acceleration correspondence value, which corresponds to a sum of a value obtained by multiplying a change acceleration of the steering torque by a gain and a rotation angular acceleration of the motor. The gain can be adjusted. Thus, the ratio of the change acceleration of the steering torque to the rotation angular acceleration of the motor can be increased. Consequently, in the case that a steering angle is reversed at high speed, the motor output correction value, which corresponds to the steering angular acceleration correspondence value, can be increased. Thus, the influence of the inertia of the steering assisting force generating motor can be compensated for with accurate timing.

Preferably, a rate of increase in magnitude of the motor output correction value in a range, in which magnitude of the steering angular acceleration correspondence value is large, is set to be larger than a rate of increase in magnitude of the motor output correction value in a range, in which the magnitude of the steering angular acceleration correspondence value is small. Consequently, in the case that the magnitude of the steering angular acceleration correspondence value is small, and that there is no necessity for compensating for the influence, the motor output correction value is prevented from becoming excessively large. Conversely, in the case that the magnitude of the steering angular acceleration correspondence value is large, and that there is high necessity for compensating for the influence, the motor output correction value is prevented from becoming insufficient. Proper inertia compensation is achieved.

Figure 1:
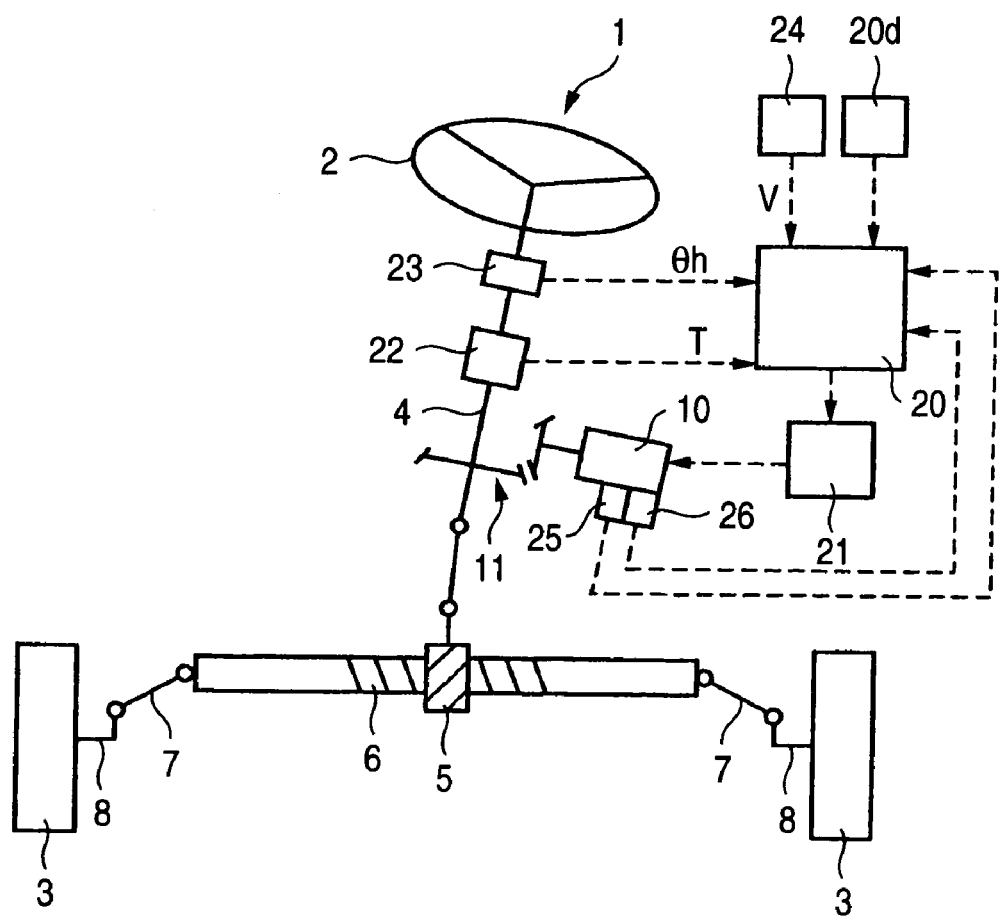
FIG. 1 is an explanatory diagram illustrating the configuration of an electric power steering device that is an embodiment of the invention.

In the drawings, the reference numeral 1 refers to an electric power steering device; 2 to a steering wheel; 3 to a vehicle wheel; 10 to a motor; 20 to a control unit; 20d to a gain regulator; 22 to a torque sensor; 25 to an inter-terminal voltage sensor; and 26 to a rotor current sensor.

DETAILED DESCRIPTION OF THE PREFERRED EMBODIMENTS

An electric power steering device shown in FIG. 1 has a mechanism for transmitting a rotation of a steering wheel (or operating member) 2, which is caused by steering, to vehicle wheels 3 so that a steering angle changes. In this embodiment, a rotation of the steering wheel 2 is transmitted to a pinion 5 through a steering shaft 4, so that a rack 6 meshing with the pinion 5 moves. The movement of the rack 6 is transmitted to the vehicle wheels 3 through a tie-rod 7 and a knuckle arm 8 Thus, the steering angle is changed.

The device 1 is provided with a motor 10 for generating a steering assisting force, which acts upon a path for transmitting a rotation of the steering wheel 2 to the vehicle wheels 3. In this embodiment, a rotation of the motor 10 is transmitted to the steering shaft 4 through a reduction gear mechanism 11. Thus, a steering assisting force is given thereto.

The motor 10 is connected through a drive circuit 21 to a control unit 20 constituted by a computer. A torque sensor 22 for detecting steering torque T transmitted by the steering shaft 4, a steering angle sensor 23 for detecting a steering angle θh, a vehicle speed sensor 24 for detecting a vehicle speed V, an inter-terminal voltage sensor 25 for detecting a voltage developed between the terminals of the motor 10, and a motor current sensor 26 for detecting a motor current are connected to the control unit 20. The control unit 20 obtains a rotation angular speed ω of the motor unit 20 rotational speed of the motor 10 from the inter-terminal voltage and the motor current, which are respectively detected by the sensors 25 and 26, and from the resistance and the counter electromotive force constant of the motor 10, which are stored therein, by using a known operation expression.

The control unit 20 controls the motor 10 so that a steering assisting force changes according to operating conditions, and that the influence of the inertia of a moving part of a steering system, which includes the motor 10, on steering can be compensated for.

Figure 2:
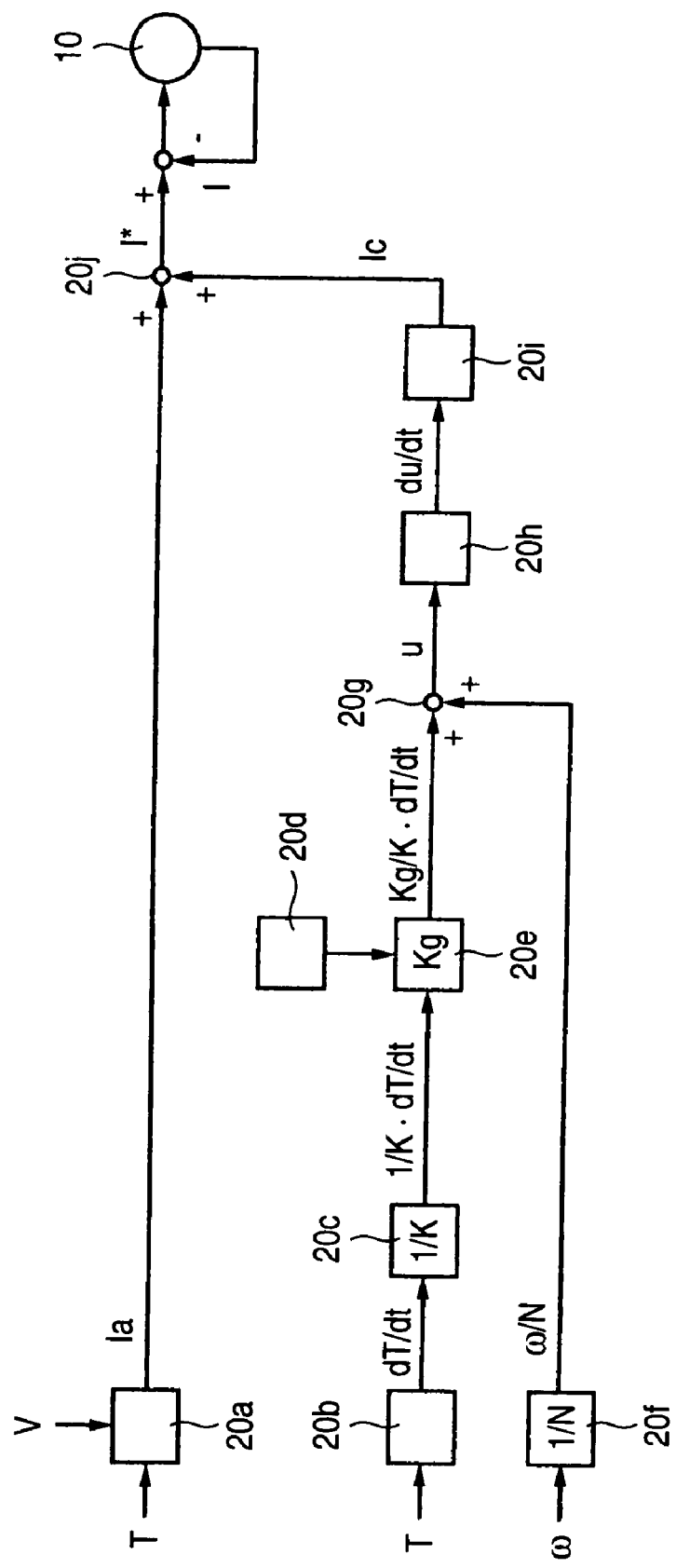
FIG. 2 is a control block diagram illustrating a motor, which is used for generating a steering assisting force, in the electric power steering device that is the embodiment of the intention.
Figure 3:
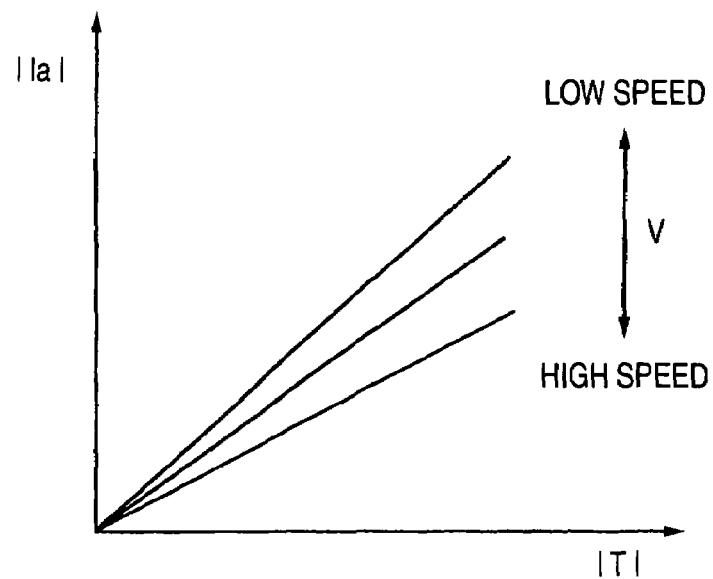
FIG. 3 is a graph illustrating the relation among the steering torque, vehicle speed, and assist current value of the electric power steering device that is the embodiment of the invention.

FIG. 2 is a control block diagram illustrating an operation of controlling the motor 10 by the control unit 20. An assist current value Ia is obtained according to the steering torque T and the vehicle speed V, which are obtained as the operating conditions, in an assist current computing portion 20a. The relation thereamong, in which the magnitude of the assist current Ia increases with increase in that of the steering torque T and with decrease in the vehicle speed V, as illustrated in, for example, FIG. 3, is preliminarily determined and stored in the control unit 20. The assist current value Ia is obtained from the stored relation, the obtained steering torque T, and the obtained vehicle speed V.

A steering torque change rate dT/dt, which is a differential value of the obtained steering torque T, is obtained at a differentiator 20b. A value $(1/K)\cdot(dT/dt)$ to be obtained by multiplying the steering torque change rate dT/dt by a constant 1/K is obtained at a multiplier 20c. In this embodiment, torque to be transmitted by the steering shaft 4 is detected as the steering torque T. Thus, the constant K corresponds to the torsional stiffness of the steering shaft 4 of a torque detecting portion. In a case where the torque detecting portion is constituted by two members connected by a torsion bar, the constant K corresponds to the torsional stiffness of the torsion bar.

A value $(Kg/K)\cdot(dT/dt)$ to be obtained by multiplying the value $(1/K)\cdot(dT/dt)$ by a gain Kg, which is adjusted by a gain regulator 20d, is obtained at a multiplier 20e. The gain regulator 20d is connected to the control unit 20 and enabled to adjust the gain Kg by being operated by an operator.

A pinion angular speed (ω/N) to be obtained by multiplying the obtained rotation angular speed ω of the motor 10 by a constant (1/N). In this embodiment, an output of the motor 10 is transmitted to the steering shaft 4 through the reduction gear mechanism 11. Therefore, the constant N is a reduction ratio of the reduction gear mechanism 11.

A steering angular speed correspondence value u, which is a sum of the value $(Kg/K)\cdot(dT/dt)$ and the pinion angular speed (ω/N), is obtained at an adder 20g.

A steering angular acceleration correspondence value du/dt, which is a differential value of the steering angular speed correspondence value u, is obtained at a differentiator 20h. Because $du/dt=(Kg/K)\cdot d^2T/dt^2+d\omega/dt\cdot(1/N)$, the value du/dt is obtained according to the steering torque T and the rotation angular speed of the motor 10 as the steering angular acceleration correspondence value, which corresponds to a sum of a value obtained by multiplying the change acceleration of the steering torque T by the gain Kg and the rotation angular speed of the motor 10. The gain regulator 20d is provided as means for regulating the gain Kg.

Figure 4:
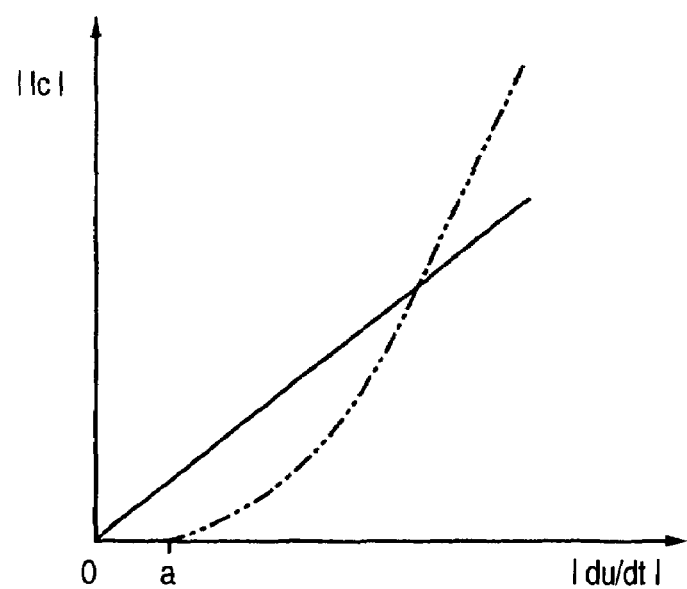
FIG. 4 is a graph illustrating the relation between the steering angular acceleration correspondence value and the compensation current value of each of the embodiment of the invention and a modification thereof.

The control unit 20 stores the relation between a motor output correction value, which is preliminarily determined in such a way as to compensate for the influence of the inertia on steering, and the steering angular acceleration correspondence value du/dt. In this embodiment, the motor output correction value is a compensation current value Ic. The relation therebetween is determined so that a steering feeling can be prevented from being worsened under the influence of the inertia when a steering speed changes The relation, according to which as the magnitude of the steering angular acceleration correspondence value du/dt increases, the magnitude of the compensation current value Ic linearly increases as indicated by solid lines in, for example, FIG. 4, is preliminarily determined and stored in the control unit 20. This relation is stored therein in the form of, for instance, a lookup table or an operation expression. The compensation current value Ic is obtained at a computing portion 20i according to the stored relation and the obtained steering angular acceleration correspondence value du/dt.

A target drive current I* of the motor 10, which is a sum of the obtained assist current value Ia and the compensation current value Ic, is obtained at an adder 20j. The control unit 20 performs feedback control operations on the motor 10 through a drive circuit Ic so that the motor current I corresponds to the target drive current. Consequently, the motor 10 is controlled such that the steering assisting force is corrected according to the compensation current value Ic.

According to the aforementioned embodiment, the influence of the inertia of the steering-assisting-force generating motor 10 is compensated for according to the value du/dt corresponding to a sum of the rotation angular acceleration of the motor 10 and the value obtained by multiplying the change acceleration of the steering torque T by the gain Kg. The gain Kg can be adjusted by the gain regulator 20d. Thus, the ratio of the change acceleration of the steering torque T to the rotation angular acceleration of the motor 10 of the sum can be increased. Consequently, in a case where the steering direction is reversed at high speed, the compensation current value Ic corresponding to the steering angular acceleration du/dt can be increased, and the influence of the inertia can be compensated for with accurate timing.

In the aforementioned embodiment, the magnitude of the compensation current value Ic linearly increases with increase in the magnitude of the value du/dt corresponding to the steering angular acceleration, as indicated by a solid line in FIG. 4. Instead, as indicated by a double-dashed-chain line in FIG. 4, the rate of increase in the magnitude of the compensation current value Ic in a range, in which the value du/dt corresponding to the steering angular acceleration is large, may be set to be larger than that of the compensation current value Ic in a range, in which the magnitude of the value du/dt corresponding to the steering angular acceleration is small, as an alternative modification. Thus, in the range in which the magnitude of the value du/dt corresponding to the steering angular acceleration is small, the magnitude of the compensation current value Ic is set to be smaller than that of the compensation current value Ic in the case of the aforementioned embodiment. Conversely, in the range in which the magnitude of the value du/dt corresponding to the steering angular acceleration is large, the magnitude of that of the compensation current value Ic in the case of the aforementioned embodiment. A range of the magnitude of the value du/dt corresponding to the steering angular acceleration from 0 to a shown in this figure is a dead zone in which the magnitude of the compensation current value IC is set to be 0. Consequently, in the case that the magnitude of the value du/dt corresponding to the steering angular acceleration is small, and that the necessity for compensating for the inertia is low, the compensation current value can be prevented from becoming excessively high. Conversely, in the case that the magnitude of the steering angular acceleration correspondence value du/dt is large, and that the necessity for compensating for the inertia is high, the compensation current value can be prevented from becoming insufficient. Proper compensation for the inertia can be performed.

The invention is not limited to the aforementioned embodiment and to the modification. For example, the rotation angular speed of the motor 10 may be directly detected by using an encoder. Alternatively, the rotation angular speed and the rotation angular acceleration of the motor may be obtained as the number of revolutions per unit of time and change in the number of revolutions per unit of time, respectively, instead of an angular speed and an angular acceleration. The mechanism for transmitting a rotation of the steering wheel to the vehicle wheels in such a way as to change the steering angle is not limited to that of the embodiment. This mechanism may be adapted to transmit a rotation of the steering wheel to the vehicle wheels through the steering shaft and a link mechanism. The mechanism for transmitting an output of the steering-assisting-force generating motor to a steering system is not limited to that of the embodiment. Another mechanism may be employed, as long as this mechanism can give a steering assisting force thereto. For instance, a steering assisting force may be given thereto by driving a ball nut to be screwed to a ball screw, which is integral with a rack, by using the output of the motor. Although the value (1/K)·(dT/dt) is multiplied by the gain Kg in the aforementioned embodiment, the steering torque change rate dT/dt may be multiplied by the gain Kg as long as the steering angular acceleration correspondence value corresponds to a sum of a value obtained by multiplying a change acceleration of a steering torque change acceleration by the gain and a rotation angular acceleration of the motor.

An electric power steering device according to the invention can compensate for the influence of the inertia of a motor, which is used for generating a steering assisting force, on steering with accurate timing and also can prevent a steering feeling from being worsened

What is claimed is:

1. An electric power steering device comprising:
a motor for generating a steering assisting force;
means for obtaining steering torque;
means for obtaining a rotation angular speed of said motor;
means for obtaining a steering angular acceleration correspondence value, which corresponds to a sum of a value obtained by multiplying a change acceleration of the steering torque by a gain and a rotation angular acceleration of said motor, according to the obtained steering torque and the obtained rotation angular speed of said motor;
means for regulating the gain;
means for storing a relation between a motor output correction value, which is preliminarily determined in such a way as to compensate for the influence of the inertia on steering, and the steering angular acceleration correspondence value; and
means for controlling said motor in such a way as to correct the steering assisting force according to the motor output correction value obtained according to the obtained steering angular acceleration correspondence value and the stored relation.

2. The electric power steering device according to claim 1,
wherein said means for controlling sets a rate of increase in magnitude of the motor output correction value in a range, in which a magnitude of the steering angular acceleration correspondence value is large, to be larger than the rate of increase in magnitude of the motor output correction value in the range, in which the magnitude of the steering angular acceleration correspondence value is small.

3. A method for controlling an electric power steering device, said method comprising:
obtaining steering torque;
obtaining a rotation angular speed of a motor for generating a steering assisting force;
obtaining a steering angular acceleration correspondence value, which corresponds to a sum of a value obtained by multiplying a change acceleration of the steering torque by a gain and a rotation angular acceleration of said motor, according to the obtained steering torque and the obtained rotation angular speed of said motor;
regulating the gain;
storing a relation between a motor output correction value, which is preliminarily determined in such a way as to compensate for the influence of the inertia on steering, and the steering angular acceleration correspondence value; and
controlling said motor in such a way as to correct the steering assisting force according to the motor output correction value obtained according to the obtained steering angular acceleration correspondence value and the stored relation.

4. An electric power steering device, comprising:
a motor for generating a steering assisting force;
means for obtaining a steering angular acceleration correspondence value, which corresponds to a value that is obtained by adding a rotation angular acceleration of said motor with a product of a change acceleration of a steering torque and a gain, according to the obtained steering torque and rotation angular speed of the motor; and
means for regulating the gain.

5. The electric power steering device according to claim 4, wherein said means for regulating the gain comprises:
   means for controlling said motor such that a rate of increase is set higher in a magnitude of a motor output correction value when a magnitude of the steering angular acceleration correspondence value is in a first range, than when a magnitude of the steering angular acceleration correspondence value is in a second range.

6. The electric power steering device according to claim 5, wherein the first range has a higher value than the second range.

7. A method for controlling an electric power steering device, said method comprising:
   generating, by a motor, a steering assisting force;
   obtaining a steering angular acceleration correspondence value, which corresponds to a value that is obtained by adding a rotation angular acceleration of said motor with a product of a change acceleration of a steering torque and a gain, according to the obtained steering torque and rotation angular speed of the motor; and
   regulating the gain.

8. The method according to claim 7, wherein said regulating the gain comprises:
   controlling said motor such that a rate of increase is set higher in a magnitude of a motor output correction value when a magnitude of the steering angular acceleration correspondence value is in a first range, than when a magnitude of the steering angular acceleration correspondence value is in a second range.

9. The method according to claim 8, wherein the first range has a higher value than the second range.

* * * * *